US006907527B1

United States Patent
Wu (10) Patent No.: US 6,907,527 B1
(45) Date of Patent: Jun. 14, 2005

(54) CRYPTOGRAPHY-BASED LOW DISTORTION ROBUST DATA AUTHENTICATION SYSTEM AND METHOD THEREFOR

(75) Inventor: Chai Wah Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 09/688,785

(22) Filed: Oct. 17, 2000

(51) Int. Cl.$^7$ ................................................. H04L 9/00
(52) U.S. Cl. ............................ 713/176; 707/9; 707/10; 707/101; 707/104.1; 382/251; 382/253
(58) Field of Search ......................... 375/240.03, 240.2, 375/240.16, 240.22, 2; 382/197; 704/230; 725/19; 714/45, 732; 713/176, 200, 201, 165, 154; 707/9–10, 101, 104.1; 380/701, 217, 216, 229, 232, 236, 237, 241

(56) References Cited

U.S. PATENT DOCUMENTS

| 6,105,072 A | * | 8/2000 | Fischer | 719/315 |
| 6,496,933 B1 | * | 12/2002 | Nunally | 713/176 |
| 6,532,541 B1 | * | 3/2003 | Chang et al. | 713/176 |
| 6,614,914 B1 | * | 9/2003 | Rhoads et al. | 382/100 |

OTHER PUBLICATIONS

Maria Paula Queluz, "Content–based integrity protection of digital images", SPIE vol. 3657, Jan. 1999, pp. 85–93.
Bhattacharjee, et al., "Compression Tolerant Image Authentication", IEEE, 1998.
Memon, et al., "Distortion Bounded Authentication Techniques", SPIE vol. 3971, 2000, pp. 164–174.
JPEG, Still Image data compression standard, Pennebaker & Mitchell, pp. 37 and 172.
Chen, et al., "Preprocessed and postprocessed quantization index modulation methods for digital watermarking", SPIE vol. 3971, 2000, pp. 48–59.
Hernandez, et al., "Improving Data Hiding by Using Convolutional Codes and Soft–Decision Decoding", SPIE vol. 3971, 2000, pp. 24–47.
Handbook of Applied Cryptography, Menezes, Von Oorschet & Vanstore, pp. 22–23 and 33.

* cited by examiner

Primary Examiner—Kim Vu
Assistant Examiner—Leynna Ha
(74) Attorney, Agent, or Firm—Stephen C. Kaufman, Esq.; McGinn & Gibb, PLLC (57) ABSTRACT

A method (and system) for generating an output file from a source file where benign modifications to a content of the output file still render the output file authentic, includes constructing an index vector from the source file, quantizing the source file, generating an authentication mark from the quantized source file and the index vector, generating an authentication tag by appending the index vector to the authentication mark, and generating the output file by appending the authentication tag to the source file.

32 Claims, 12 Drawing Sheets

DCT COEFFICIENTS OF BLOCK a OF COLOR PLANE 1

BITS OF INDEX VECTOR X $a_{ij}$ IS THE j-TH DCT COEFFICIENT OF BLOCK a OF COLOR PLANE i.

$xa_{ij}$ IS THE BIT CORRESPONDING TO THE QUANTIZATION FUNCTION CHOSEN FOR DCT COEFFICIENT $a_{ij}$.

COLOR IMAGE

CRYPTOGRAPHY-BASED LOW DISTORTION ROBUST DATA AUTHENTICATION SYSTEM AND METHOD THEREFOR

BACKGROUND OF THE INVENTION

1. Field of the Invention

The present invention generally relates to authentication of data such as an image or video which survive incidental modifications to the data content caused by, for example, noise, lossy compression-decompression, or digital-to-analog-to-digital (D/A/D) conversion of the data file, which do not affect the authenticity of the file.

2. Description of the Related Art

In a world where electronic multimedia data such as images and video data are transferred and modified routinely, authentication of data becomes important in verifying the integrity of the data. In these applications, data being authentic includes the notions that the data has not been tampered with, or that it came from the right owner (i.e., the origin of the data can be verified). One of the requirements in an authentication system for multimedia data such as images, video and sound is that the data survives incidental modifications such as lossy compression-decompression, noise, printing and scanning, or digital-to-analog-to-digital conversion while retaining its authenticity. On the other hand, malicious modifications should render the data inauthentic. Such authentication systems are called robust authentication systems.

Almost all authentication systems proposed have the following general form. That is, some essential data is extracted from the source data, from which an authentication tag is created. The authentication tag is appended or inserted into the source data. The result is called authenticatable data. As the authentication tag is generally much smaller than the source, as some data reduction occurs in generating the tag. In some robust authentication systems, to enable authentication, the authenticatable data is distorted from the source data. This distortion is referred to as authenticatibility distortion.

To authenticate the authenticatable data, the appended (or inserted) authentication tag is extracted from the data. Next, the essential data is extracted from the data from which a second authentication tag is created. These two authentication tags are then compared. If they compare favorably, then the image is deemed authentic.

Most of the conventional robust authentication schemes can be classified into two classes. The main difference between the two classes lies in the way data reduction is performed.

The first class performs data reduction by extracting some relevant features (such as the edges in the image) from the data and uses them in the authentication tag (e.g., see "Content-based integrity protection of digital images", Maria Paula Queluz, Proceedings of SPIE, vol. 3657, 85–93, 1999; "Compression Tolerant Image Authentication", Sushil Bhattacharjee and Martin Kutter, Proc. ICIP 1998; and commonly-assigned U.S. patent application Ser. No. 09/398, 203 entitled "Semi-fragile Watermarks" filed on Sep. 17, 1999 to Martens et al.).

In these systems, small changes in the image result in small changes in the tag. Furthermore, as authenticity is based on similarity between the two tags, small differences between the two tags do not destroy the authenticity of the file. There is little or no authenticability distortion.

However, a drawback of this type of authentication scheme is that, because small changes in the image result in small changes in the tag, it is potentially easy to find forged images which generate the same or similar tags as the original image. For example, as pointed out in "Distortion Bounded Authentication Techniques", Nasir Memon, Poorvi Vora, Boon-Lock Yeo and Minerva Yeung, Proceedings of the SPIE, vol. 3971, pg. 164–174, 2000, many images have the same set of edges, yet the content of the images are different (e.g., an image of a coffee stain versus a blood stain). In the language of cryptography, the function which computes the tag from the original image is not pre-image resistant.

A second type of authentication scheme utilizes a cryptographic hash function to reduce the data and generate a relatively small tag from the image. In this case, the two tags must be identical to ensure authenticity. The reader is referred to, for example, the aforementioned paper by Memon et al. It is noted that cryptographic hashes have the property that small changes in the image result in large changes in the tag and the use of a cryptographic hash function makes it extremely difficult to generate forged images that have the same tag as the original image.

However, these methods modify the source image significantly in order for the image to be authenticatable (i.e., there is a significant amount of authenticability distortion). For example, in the paper by Memon et al., the pixels of the image are quantized and the quantized image is made authenticatable. The amount of authenticability distortion applied to the image can be as large as the maximum amount of modification to the image that the authentication system is willing to tolerate before the image is deemed inauthentic. This is not acceptable in cases where the authenticatable images must be of high quality, whereas images of a lesser quality can be considered authentic. This is especially true when the images are printed on paper and authentication is done by scanning the printed image. In an application such as the "digital notary" which will be presented below, the authentication distortion must be zero.

SUMMARY OF THE INVENTION

In view of the foregoing and other problems of the conventional methods and systems, an object of the present invention is to provide a robust authentication system (and method) that survives minor modifications to the data which combines the advantages of the two classes of robust authentication systems discussed above. N In a first aspect, a method for generating an output file from a source file where benign modifications to a content of the output file still render the output file authentic, includes constructing an index vector from the source file, quantizing the source file, generating an authentication mark from the quantized source file and the index vector, generating an authentication tag by appending the index vector to the authentication mark, and generating the output file by appending the authentication tag to the source file.

Preferably, the inventive system (and method) modifies the data little or not at all in generating the authenticatable data by minimizing or reducing the authenticability distortion, yet utilizes digital signatures and cryptographic hash functions to make forgery attacks difficult.

To make the data I authenticatable, first an n-dimensional vector V corresponding to some essential features of data I is constructed from data I. This vector is referred to as the feature vector of the data. It is preferable that the function which computes V from I is smooth. Furthermore, it is preferable that this function is invertible or nearly invertible to avoid the problems of the first class of algorithms discussed earlier. Some examples of feature vectors in the case of images include properly scaled, possibly quantized, Discrete Cosine Transform (DCT) coefficients or properly scaled, possibly quantized, Discrete Fourier Transform (DFT) magnitude coefficients. It is desirable to have V be a real n-dimensional vector in an appropriate space where distances correspond roughly to perceptual differences or some metric which indicates the amount of malicious modifications.

For each of the n components of V, a quantization function is chosen from a predetermined set of quantization functions. The quantization function is chosen to have a small quantization error with respect to this component. The information about which quantization functions are chosen is stored in the index vector X. The feature vector V is quantized by these quantization functions, the quantized feature vector and the index vector X are signed jointly by a digital signature algorithm and the resulting signature along with a losslessly compressed form of X form the authentication tag T.

Next a modified data I' is made from data I. For example, in the case of images, I' could be obtained from I by, lossy compression such as Joint Pictures Experts Group (JPEG) format processing. A general text on the JPEG compression standard is "JPEG: still image data compression standard" Pennebaker and Mitchell, Von Nostrand Reinhold, 1993. I' can depend on the feature vector V. The difference between I' and I is the authenticability distortion.

In practical implementations, this distortion is preferably made to be minimal. In some embodiments where this distortion is desired to be zero, I' is set equal to I.

Then, this authentication tag T is appended or inserted into I' resulting in authenticatible data.

To authenticate a dataset, the authentication tag T is first extracted from the dataset. Then, the index vector X is extracted from T by removing the signature S and decompressing the remainder.

Using X, a set of quantization functions is found. Then, the feature vector V is constructed from the dataset, quantized using the set of quantization functions corresponding to X, and the signature S in T is verified as to whether it corresponds to signing the quantized V and X jointly. If so, the data is authentic. Otherwise, the data is not authentic.

With the invention, forgeries are prevented (or made extremely difficult) by the use of cryptographic hash functions since it is difficult to find forged images which generate the same or similar tags as the original image. Hence, a much more secure system and method are provided unlike the first type of conventional scheme. Further, because of the use of more than one quantization function, the inventive method and system do not modify the source image significantly in order for the image to be authenticatable, thereby overcoming the problems of the second class of conventional schemes. Thus, there is not a significant amount of authenticability distortion.

As described below, the inventive method and system allow various parameters such as the length of the authentication tag or the maximum amount of modification tolerated to be traded off in a gradual manner against the amount of authenticability distortion.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
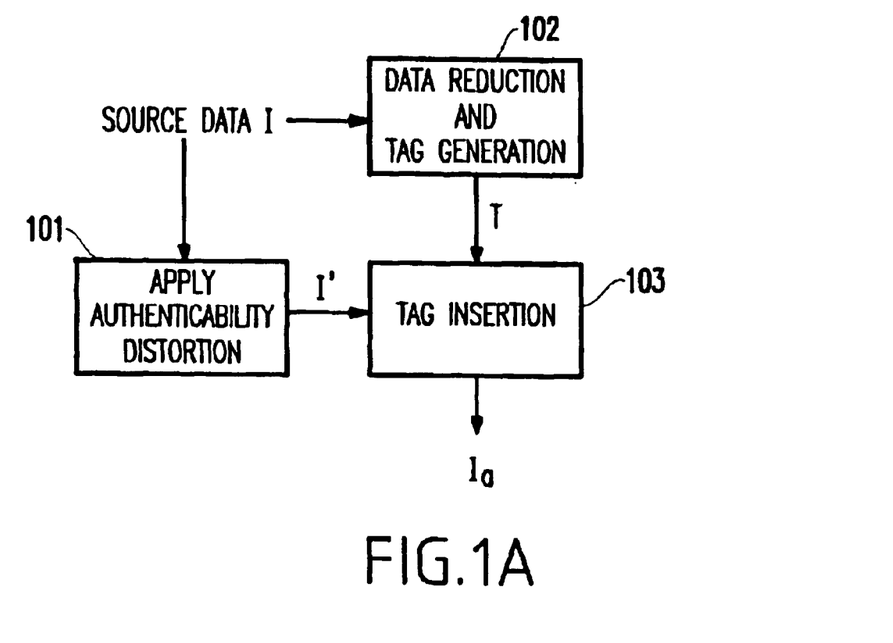
FIGS. 1A–1B are flow diagrams illustrating the steps of a general authentication scheme including generation of authenticatable data and authentication of data, respectively.
Figure 1B:
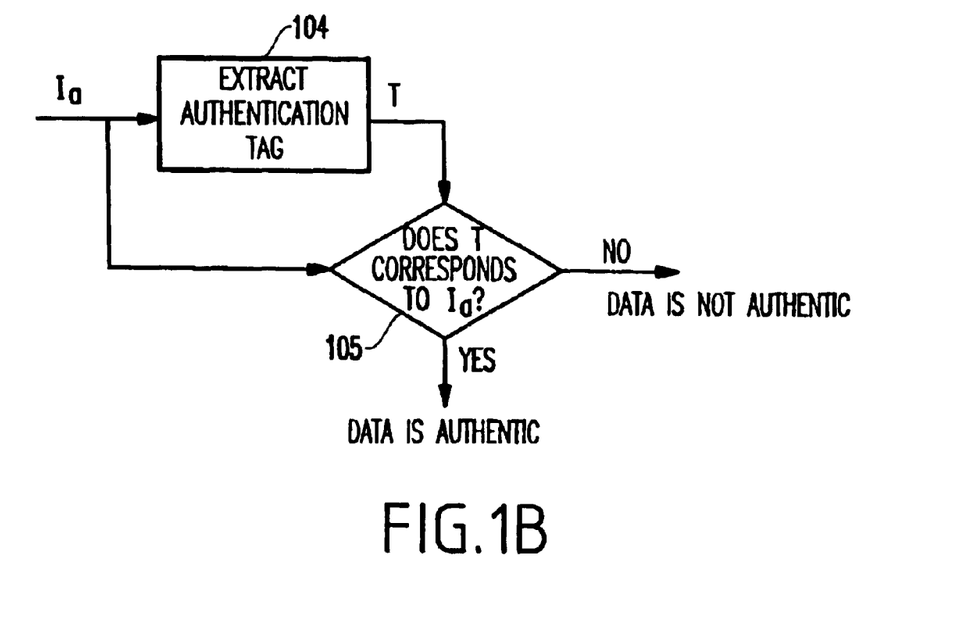

Referring now to FIGS. 1A–1B, there is shown a diagram of a general data authentication system.

FIG. 1A shows the process of generation of authenticatable data and FIG. 1B shows the authentication process. A source data (e.g., image, video, etc.) I is fed into data reduction and tag generation device 102 which reduces the data and generates an authentication tag T. In data preprocessor 101, an authenticatibility distortion is applied to the source data I, thereby resulting in data set I'. Then, the authentication tag T is combined with the data set I' in 103 to generate authenticatable data $I_a$.

To authenticate $I_a$, as shown in FIG. 1B, the authentication tag T is extracted from $I_a$ (104) and T is used to check whether $I_a$ is authentic (105).

Figure 2A:
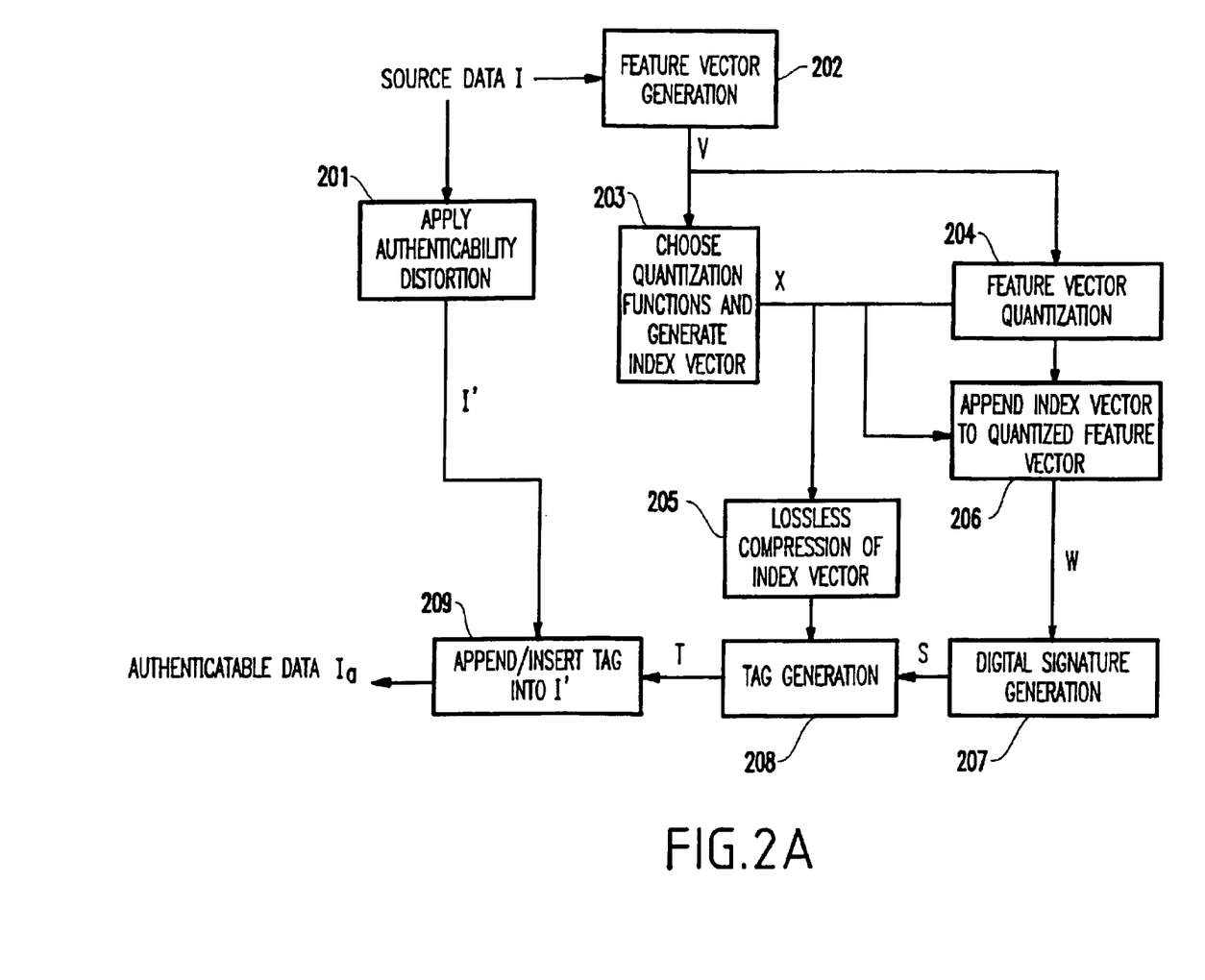
FIGS. 2A–2B are flow diagrams of the authentication scheme of the present invention including generation of authenticatable data and authentication of data, respectively.
Figure 2B:
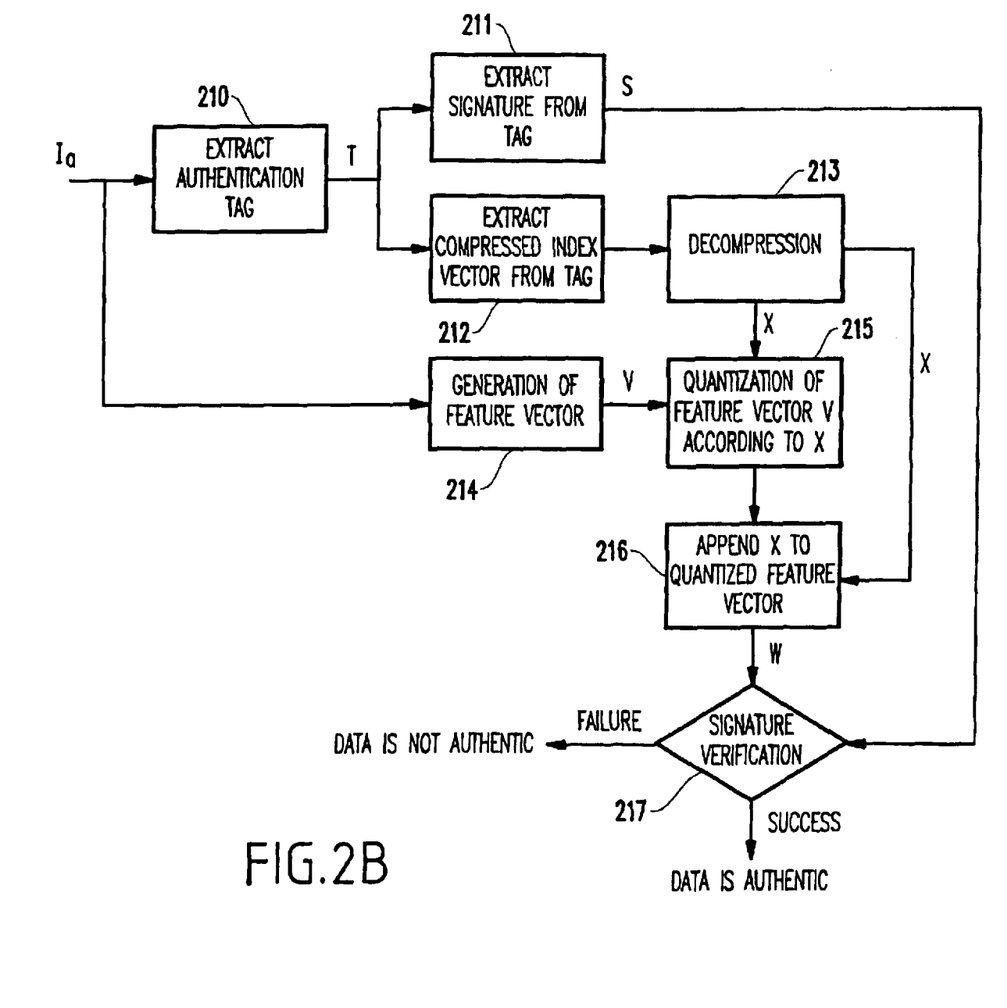

Referring now to FIGS. 2A–2B, there is shown a diagram of the preferred embodiment of the present invention.

FIG. 2A shows the process of generation of authenticatable data and FIG. 2b shows the authentication process according to the present invention.

Authenticatable Data Generation

First, a series of quantization functions q(j) are fixed (selected) in advance (e.g., five functions are selected in a set). The quantization functions can be considered as a data reduction function such that a data set is taken (e.g., 16 bits) and a smaller data set is generated (e.g., 1-bit). In general, a, quantization function can be any function which is not one-to-one. In practice, a quantization function maps well defined or connected regions of points to a single point. The quantization functions are selected such that at any point selected in a space, there is at least one of these quantization functions in which the point in the space is in the middle of the set such that if movement (distortion) of the image is made, then the point will map to the same thing.

Then, the feature vector V is computed from the source data I in 202. Such a vector V can be computed from a source file by an algorithm or be set to be equal to I.

For each component $V_i$ of V, a quantization function $q(j_i)$ is chosen in 203. $q(j_i)$ is chosen such that the quantization of $V_i$ using $q(j_i)$ results in a predetermined small amount (or the least amount) of quantization error. That is, as noted above, once the quantization functions are selected, given any point, the function selected will be the one which gives the smallest error. It is noted that the invention will still be operable even if the quantization function selected is not the one providing the smallest error. However, there may be lower performance.

The indices $j_i$ are stored in the index vector X. Then, feature vector V is quantized according to $q(j_i)$ (204). Then, index vector X is appended to the quantized V resulting in W (206).

A digital signature algorithm (207) is applied to W resulting in a signature S. Index vector X is then compressed (205) with a lossless compression algorithm and appended to S (208), thereby resulting in an authentication tag T. Authenticability distortion is applied to I resulting in I' (201).

Then, T is appended or inserted into I', thereby resulting in authenticatable data $I_a$ (209). (It is noted that steps 201, 202, and 205 are optional to the method of the invention, but are preferably performed.).

Data Authentication

Referring to FIG. 2B, to authenticate $I_a$, T is first extracted (210). Then, the signature S is removed from T (211). The remaining portion of T is a compressed index vector (212). Then, this compressed index vector is decompressed, thereby to obtain the index vector X (213), and a feature vector V is computed from $I_a$ (214).

Using the indices $j_i$ in X, the components of V are quantized using $q(j_i)$ (215). X is appended to the quantized V, thereby resulting in W (216). Then, W is verified using the corresponding signature verification algorithm and the signature S (217). If the signature S verifies with W, the data is authentic. Otherwise, it is not authentic.

In an alternative implementation, the data set W in both the generation of the tag and in the authentication phase is generated by appending the compressed form of X to the quantized V.

Image Data Set

Figure 3A:
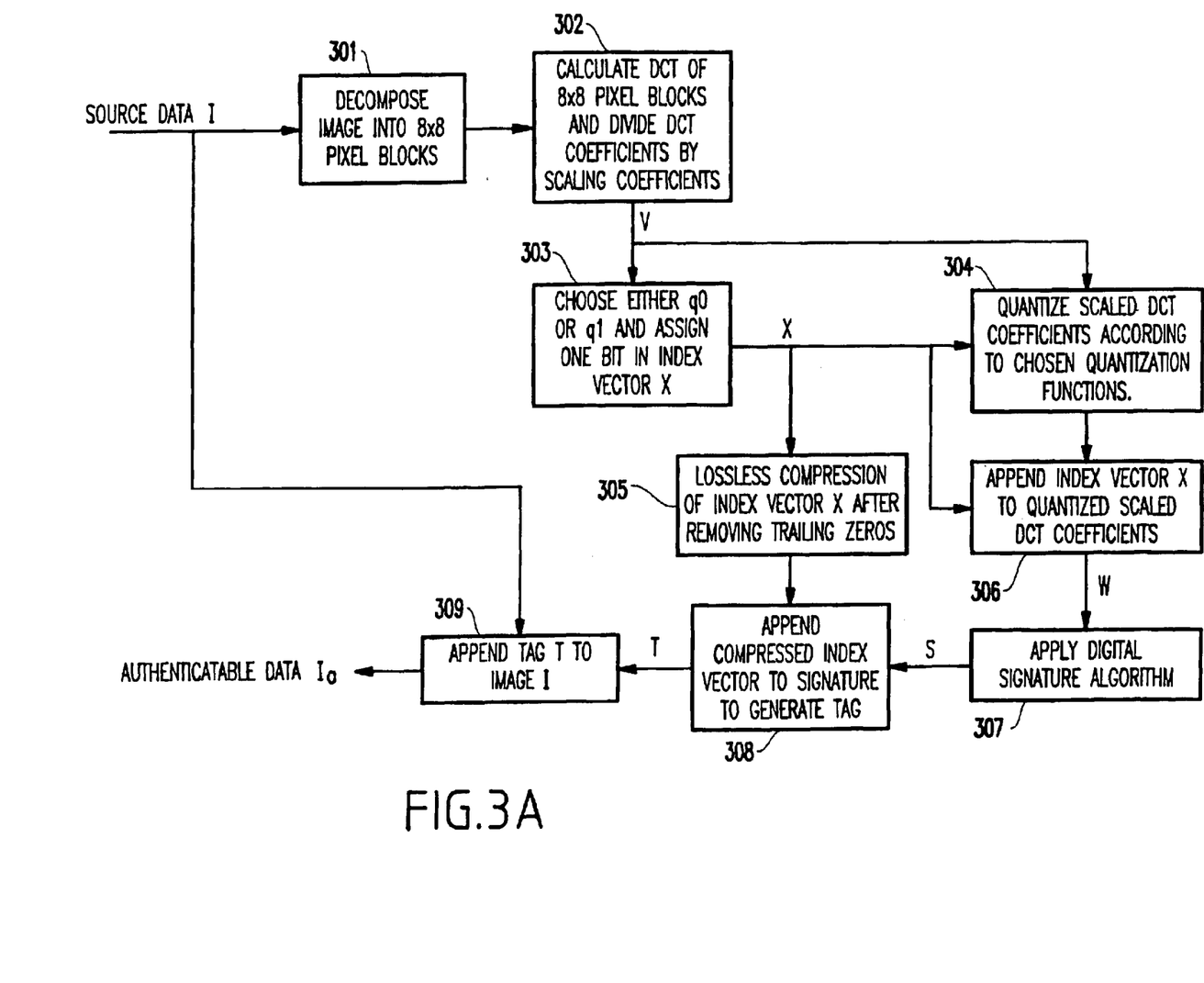
FIGS. 3A–3B are flow diagrams of a preferred embodiment of the present invention including generation of authenticatable data and authentication of data, respectively.
Figure 3B:
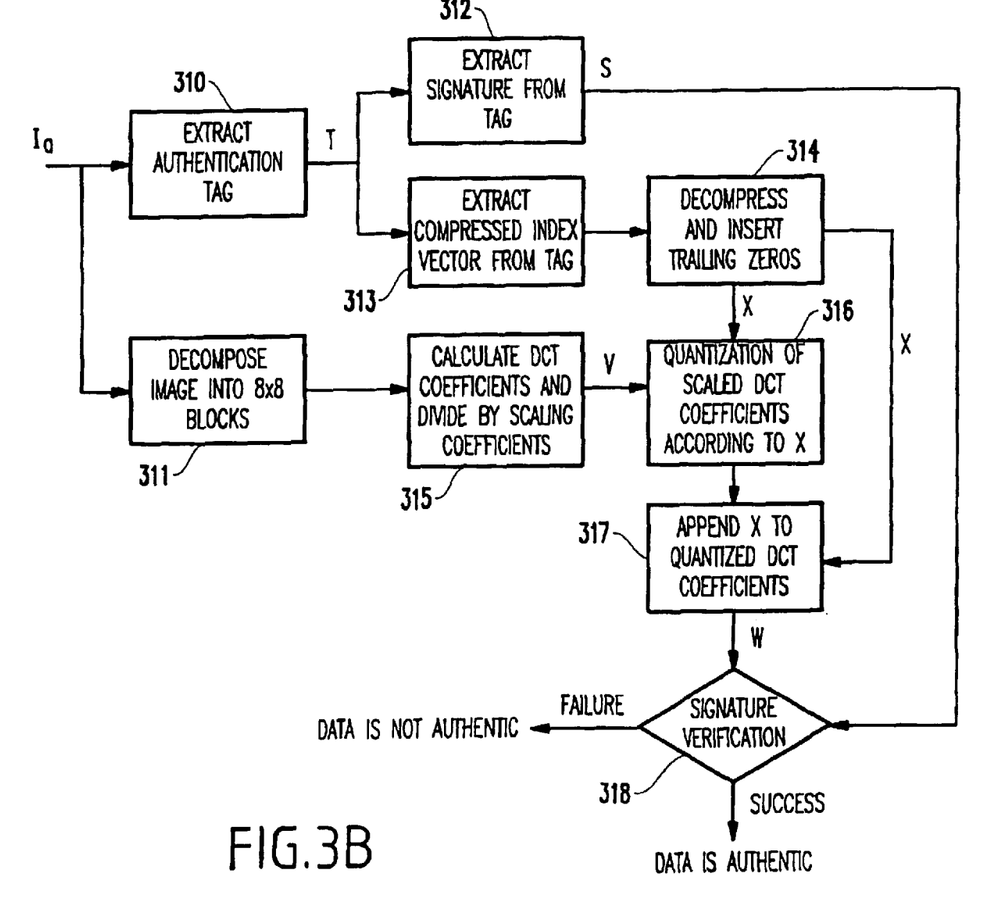

Referring now to FIGS. 3A–3B, a preferred embodiment of the invention is shown for when the data set is an image and these Figures illustrate a special implementation of the invention.

That is, FIG. 3A shows the process of generation of authenticatable data and FIG. 3B shows the authentication process for when the feature being used/examined is a discrete cosine transform (DCT) coefficient described in further detail below. The case of a grayscale image will be considered first.

First, the image is separated into 8×8 pixel blocks (301). When (if) the image cannot be partitioned into 8×8 pixel blocks, rows and columns of zeros are added to the image until it can. Another method of adding rows and columns of pixels is by reflecting pixels along the image boundaries.

For each block, a 2-dimensional Discrete Cosine Transform (DCT) is applied. Then, each DCT coefficient is scaled by dividing it by a corresponding scaling value (302). Examples of tables of such scaling values are given in Tables 4-1 and 4-2 of the aforementioned book by Pennebaker and Mitchell.

Next, for each of the resulting scaled DCT coefficients, one of two quantization functions (i.e., q0 or q1) is chosen (303). The two quantization functions q0 and q1, are shown in FIG. 4. q0 and q1 can be expressed as $$q0(x) = \text{round}(x)$$

$$q1(x) = \text{round}(x+0.5) - 0.5$$

where round(x) is the integer closest to x.

Figures 4, 5A:
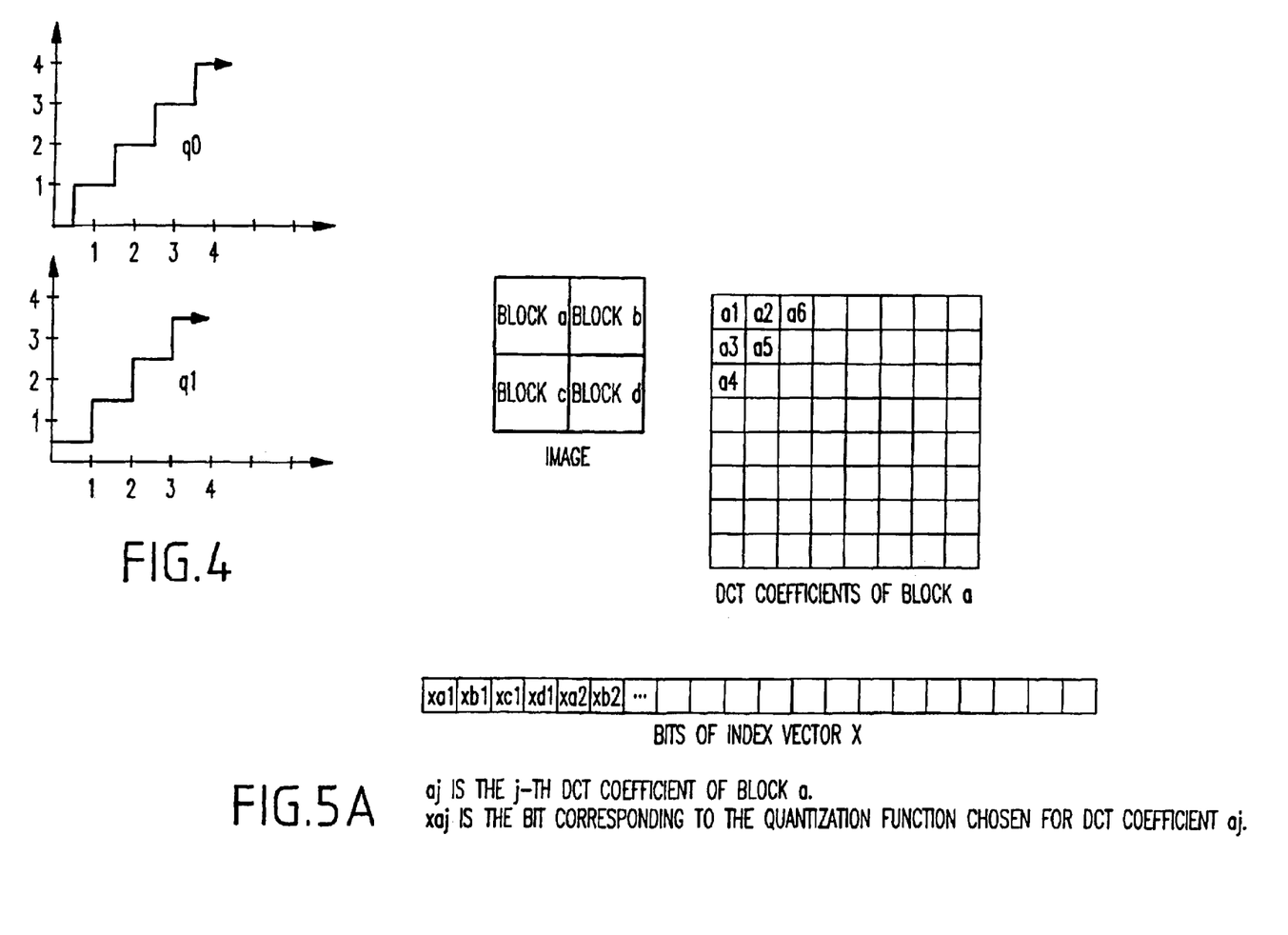
FIG. 4 is a diagram of the quantization functions used in a preferred embodiment of the present invention.
FIGS. 5A–5C show how the bits in X are ordered in a preferred embodiment for an example image with 4 blocks, with FIG. 5A being for a grayscale image, FIG. 5B being for a color image, and FIG. 5C being another ordering of the bits in X for a color image.

That is, FIG. 4 shows the quantization functions used in the preferred embodiment of the present invention. In the X axis of FIG. 4 is the input of the data (e.g., 16-bit data, a real number, etc.) and the Y-axis is the output. In both q0 and q1, a range of inputs is mapped to the same value on the Y-axis. Thus, for a range of data, input would be received and a same number would be output. This is the data reduction which allows the image to tolerate some minor modification.

The range of a quantization function is called the quantized values. In particular, the quantized values of q0 are the integers $\{ \ldots, 0, 1, 2, 3, \ldots \} = Q0$ while the quantized values of q1 is $\{ \ldots, 0.5, 1.5, 2.5, 3.5, \ldots \} = Q1$. The quantization function q chosen is the one which minimizes the quantization error (i.e., if x is the DCT coefficient, then choose q such that $|q(x)-x|$ is minimal). Another method to choose the quantization function is to choose the quantization function qt where $$t = \arg\min_{j \in \{0,1\}} d(Qi, x)$$

and d(Qi,x) denotes the distance from x to the set Qi in the space of real numbers. In the case of q0 and q1 as described above, these two methods give the same result. In case of a tie (e.g., $|q1(x)-x|=|q0(x)-x|$), a quantization function (e.g., either of q0 or q1) is randomly chosen.

For each DCT coefficient, a single bit of the index vector X is assigned to determine which of the two quantization function is chosen (i.e., a "0" bit is assigned if q0 is chosen and a "1" bit is assigned if q1 is chosen). These bits form the index vector X (303). Thus, there are as many bits in X as there are pixels in the image.

For a color image, the feature vector V is derived from the DCT coefficients of 8 by 8 blocks in all the three color planes. In this case, the number of bits in X is three times the number of pixels in the image.

Then, the DCT coefficients are quantized according to the chosen quantization functions (304). The function q1'(x)= round(x+0.5) can also be used instead of q1(x)=round(x+ 0.5)−0.5 in generating the quantized DCT coefficients. This insures that all the quantized DCT coefficients, are integers. Then, X is appended to the quantized DCT coefficients, thereby to form W (306).

Then, W is signed by a digital signature algorithm such as a DSA (digital signature algorithm) (307), thereby resulting in a signature S. Examples of digital signature algorithms can be found in "Handbook of Applied Cryptography", Menezes, van Oorschot and Vanstone, CRC Press, 1997. Practical digital signature algorithms typically include a cryptographic hash function to reduce the data and generate a relatively small signature.

Then, the index vector X is compressed using a lossless compression algorithm such as Huffman encoding or Lempel-Ziv-Welch (LZW) encoding (305). A useful textbook on compression algorithms is "Introduction to data compression", Khalid Sayood, Morgan X Kaufmann Publishers, Inc., 1996.

In the preferred embodiment, the bits which form X are ordered as follows to facilitate compression of X. Consider the ordering of the DCT coefficients in each block as described in FIG. 10-5 in the text by Pennebaker and Mitchell.

Figure 5B:
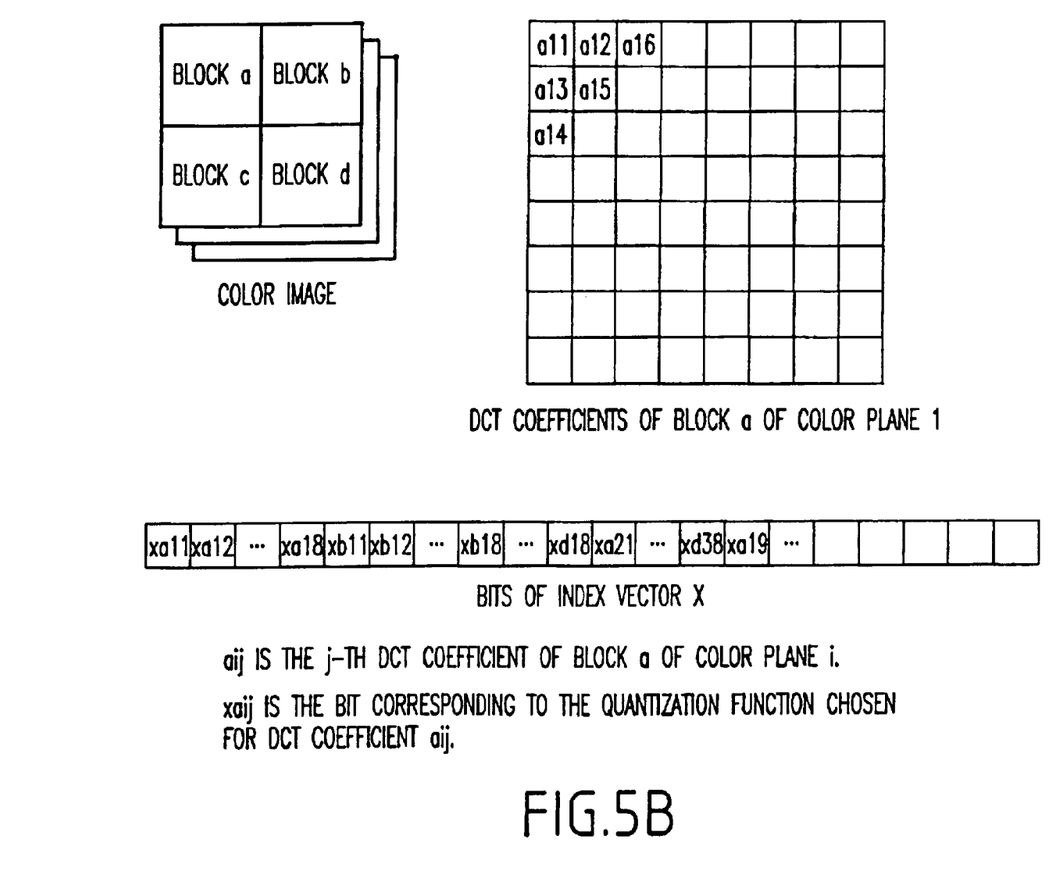
Figure 5C:
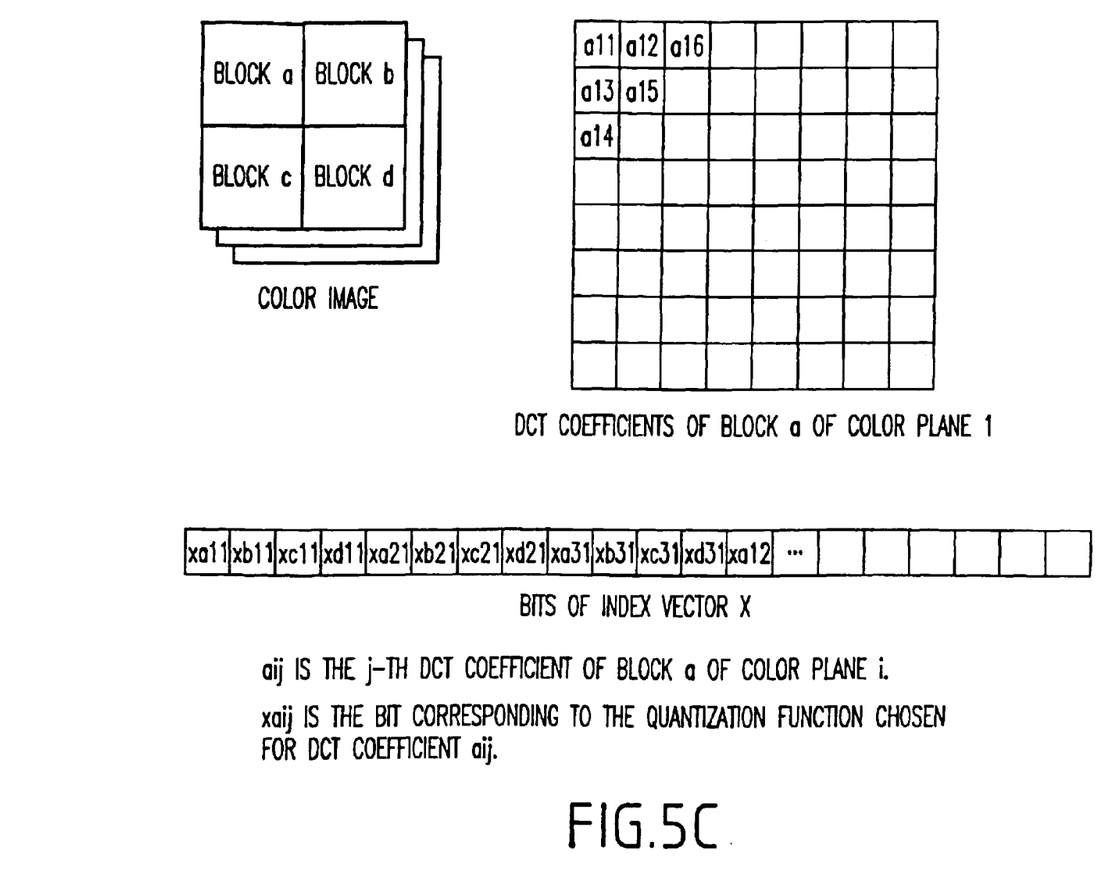

FIGS. 5A–5C show how the bits in X are ordered in a preferred embodiment for an example image with 4 blocks, with FIG. 5A being for a grayscale image, FIG. 5B being for a color image, and FIG. 5C being another ordering of the bits in X for a color image.

First, the bits corresponding to the first DCT coefficient in each block are collected, then follows the bits corresponding to the second DCT coefficient in each block, etc., as illustrated in FIG. 5A.

If a color image is considered, first the bits corresponding to the first 8 DCT coefficients of the first color dimension (i.e., R in RGB space, L in LAB space, C in CMY space, etc. depending upon the color space) in each block are collected, then followed by the bits corresponding to the first 8 DCT coefficients of the second color dimension in each block, etc., as illustrated in FIG. 5B.

FIG. 5C illustrates another ordering for the bits of index vector X in the case of a color image and simply shows a modification of what is shown in FIG. 5B in ordering the bits. First, the bits corresponding to the first DCT coefficient of the first color dimension (i.e., R in RGB space, L in LAB space, etc.) in each block are collected, then followed by the bits corresponding to the first DCT coefficient of the second color dimension in each block, etc.

Since it is known exactly how many bits are in X (e.g., it equals the number of 8×8 blocks in a grayscale image), the trailing zeros in X can be removed before compression (305). In the authentication phase, again it is known how many bits are in X, so X is retrieved by decompression and adding the right amount of trailing zeros (314). It is noted that the steps of adding and removing trailing zeros are optional.

The compressed form of X is appended to the signature S to form an authentication tag T (308). Then, this authentication tag is appended onto or inserted into the image I (309).

The tag T can be appended onto I by writing it into the comment field of the image format. Image formats which support such fields include JPEG and Tag Image File Format (TIFF). For example, the tag T can be appended onto I by writing T into the "COM" (Comment) marker segment or the Image Description Tag when the JPEG image format or the TIFF image format are used, respectively. The tag T can also be inserted into I by a robust data hiding scheme. Examples of robust data hiding schemes can be found in "Improving data hiding by using convolutional codes and soft-decision decoding" J. R. Hernandez, J-F Delaigle and B. Macq, Proc; SPIE, vol. 3971, pg. 24–47, 2000 and "Preprocessed and postprocessed quantization index modulation methods for digital watermarking", B. Chen and G. W. Wornell, Proc. SPIE, vol. 3971, pp. 48–59, 2000. The robust data hiding schemes should be robust enough such that the tag T can be recovered from the image exactly even under minor modifications to the image.

To authenticate an authenticatable image, the authentication tag T is extracted (310). After the signature S is removed from T (312), the remainder of T forms the compressed index vector (313). This is decompressed and trailing zeros are added to obtain X (314).

Then, the image is decomposed into 8×8 blocks (311), and a DCT operation is applied to each block and scaled by dividing the DCT coefficients by scaling values (315). Then, the DCT coefficients are quantized according to the quantization functions given by the bits in X (316). Then, X is appended to the resulting quantized DCT coefficients (317), and the result is verified with the signature S by the corresponding signature verification algorithm (318). If it is verified, then the image is authentic. Otherwise, the image is deemed to be not authentic.

The use of a digital signature algorithm in 207, 217, 307, and 318 can be replaced with message authentication codes or modification detection codes, depending on the type of application. For a complete discussion of such codes, the reader is referred to the text by Menezes et al. mentioned above.

In the above preferred embodiment, when the authentication tag T is appended to the image by writing into the comment field of the image format, there is no authenticability distortion. Thus, in the flow diagram of FIG. 2A, I'=I. When there is an invertible transformation between the image I and the feature vector V, there are two modifications to the preferred embodiment which allows the present invention to trade off authenticability distortion against some other parameter of the system. Essentially, these two modifications to the preferred embodiment include a step to apply authenticability distortion (201) and they create I'≠I.

In the first modification, it allows the invention to trade off the authenticability distortion against the size of the authentication tag.

In the second modification, it allows the invention to trade off the authenticability distortion against the amount of modification the image can tolerate before it is deemed not authentic.

In the first modification, the image is distorted as follows. Without loss of generality, assume that for the given feature vector V, the number of zeros in the bits of X is larger than the number of ones. For the components $x_i$ of the feature vector V which are closer towards the quantized values of q1 than to those of q0, they are moved closer towards the quantized values of q0.

Figure 6:
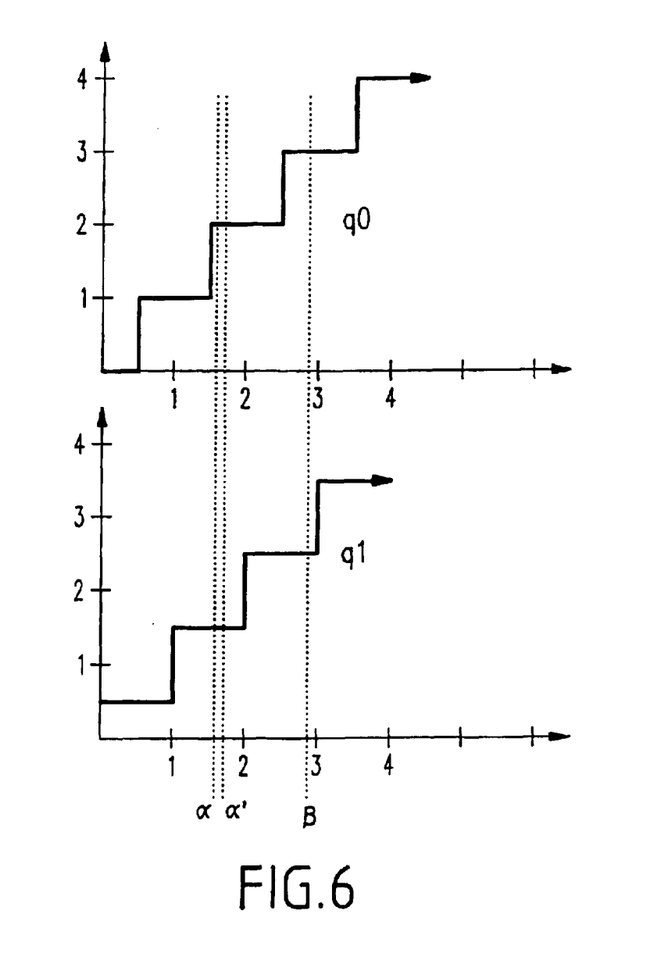
FIG. 6 shows how the components of the feature vector V should be distorted in a modification of the preferred embodiment of the present invention, to trade off authenticability distortion against the size of the authentication tag.

Thus, if $d(x_i,Q0) \geq d(x_i, Q1)$, then $_i$ is moved towards $y_i$, where $y_i$ is the closest point to $x_i$ such that $d(y_i,Q0)<d(y_i,Q1)$. This is shown in FIG. 6 where α is moved to α', whereas β is not moved since $d(\alpha,Q0)>d(\alpha,Q1)$ and $d(\beta,Q0)<d(\beta,Q1)$. Providing more or less distortion shortens more or less the tag respectively. Depending on how much these components are moved, this results in the index vector having even more zeros and thus being more compressible, thereby resulting in a smaller authentication tag T. In particular, if $x_i$ is changed to $y_i$, then the resulting index vector includes solely zeros and can be compressed into a single bit after removing trailing zeros.

Figure 7:
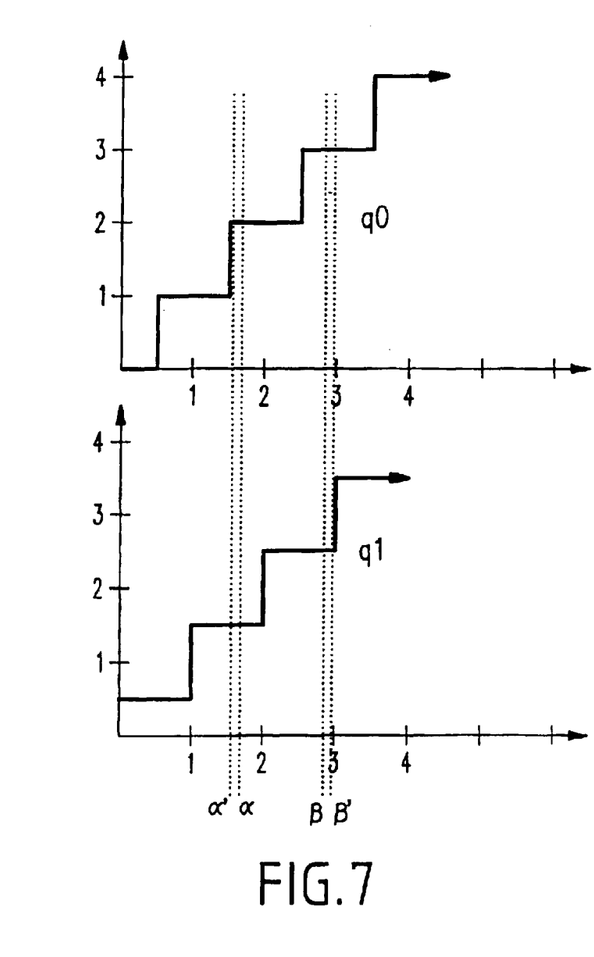
FIG. 7 shows how the components of feature vector V should be distorted in a modification of the preferred embodiment to trade off authenticability distortion against the amount of modification tolerated before the image becomes inauthentic.

In the second modification, the components of the feature vector are distorted by moving them closer to the nearest quantized values among the quantized values of q0 and q1. This is shown in FIG. 7 where α is moved to α' and β is moved to β'. This allows the image to tolerate more changes before it is deemed not authentic.

In contrast to FIG. 6 which shows the amount of distortion which trades off against the size of the tag, whereas FIG. 7 shows how to trade off against the impact of minor changes to the image. Hence, both FIGS. 6 and 7 are trying to change the image (i.e., add authenticability distortion) to produce an authenticatable image, but both trade off different things. That is, in FIG. 6, as enough distortion is added, then a trade off is made that the tag becomes very small. In FIG. 7, as enough distortion is added, the authenticatable image can tolerate more changes to the image before losing its authenticity.

Figure 8:
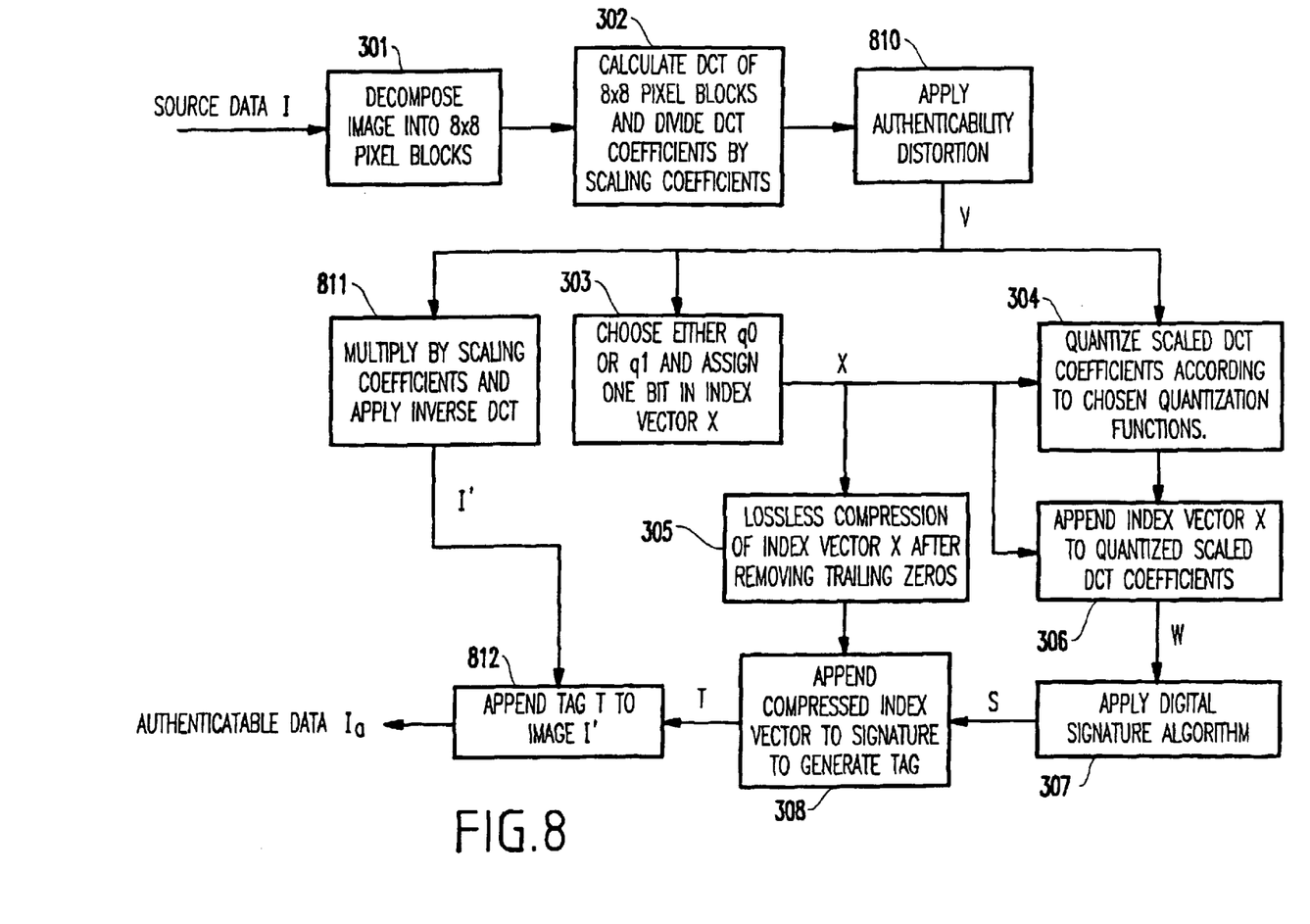
FIG. 8 is a flow diagram of the generation of authenticatable data in a preferred embodiment of the present invention where authenticability distortion is applied.

These modifications only affect the generation of authenticatable data (e.g., see FIG. 3A). By adding these modifications to FIG. 3A, FIG. 8 results, which shows a flow diagram of the generation of authenticatable data in a preferred embodiment with these modifications. That is, FIG. 8 is similar to FIG. 3A, but shows the distortion being added.

In both of these modifications to the preferred embodiment, after the feature vector V is distorted (810), a new image I' is constructed from V (811). The rest of the scheme remains the same and the tag is appended (or inserted) into I' (812) to form the authenticatable data. It is noted that both of these modifications can be applied simultaneously or in different parts of the image. It is clear how these modifications can also be adapted to the general system described in FIGS. 2A–2B.

In yet another modification of the above preferred embodiment, more than two quantization functions are used.

When the image is printed or displayed, the authentication tag can be printed or displayed alongside the image in a robust format. For example, the authentication tag which includes a series of bits can be printed below the image in a 1-D or 2-D barcode format or in an OCR (optical character recognition)-friendly font.

In some applications, the tag can be printed (or attached) as a magnetic strip or an RFID (Radio Frequency Identification) tag alongside the image. To authenticate the printed image, the image itself is scanned in while the authentication tag is read-in by either a scanner, a barcode reader, a magnetic strip reader, an RFID reader or other appropriate technologies.

Some image processing operations such as thresholding and removal of minor noise can be applied to the scanned image before authentication.

The present invention has applications in authenticating printed documents which are printed either locally by a trusted printer or remotely. For example, the present invention can be adapted to be used in U.S. patent application Ser. No. 09/398,028, filed on Sep. 17, 1999 to Braudaway et al., entitled "METHOD AND SYSTEM FOR REMOTE PRINTING OF DUPLICATION RESISTANT DOCUMENTS" for printing duplication resistant documents. The paper medium on which the document is printed is duplication-resistant and contains identifying information such as a serial number. The image containing the content of the document along with the identifying information on the paper medium form a composite image which is then made authenticatable by the present invention. Then, the image containing the content of the document is printed on the paper medium along with the tag which is printed in a machine-readable format such as a barcode.

Figure 9:
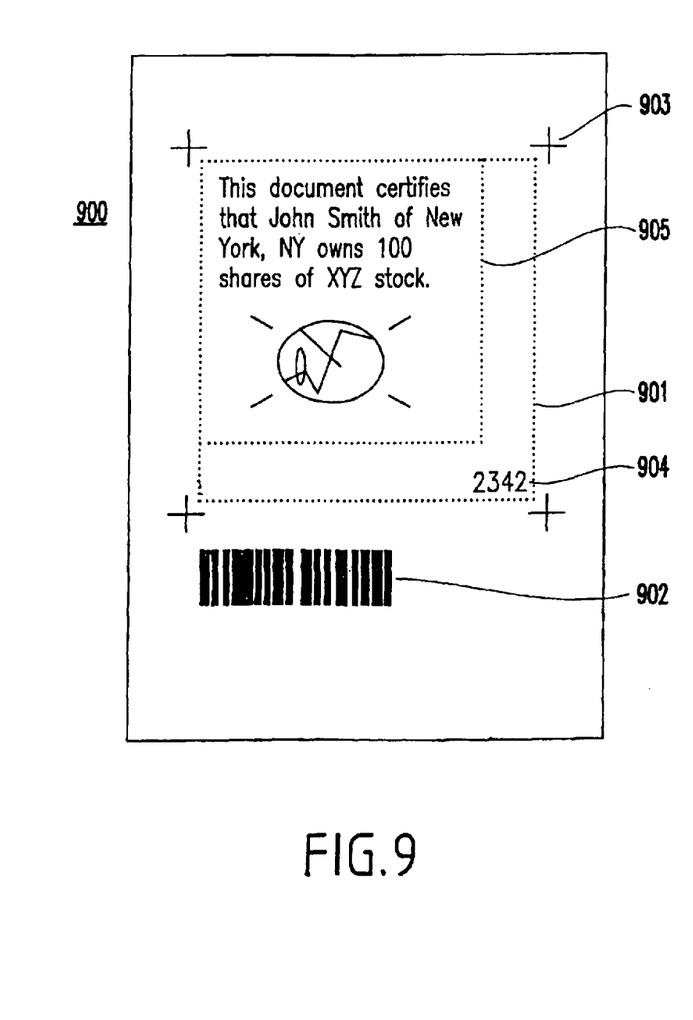
FIG. 9 shows an application of the proposed invention to generate authenticatable printed documents.

As shown in FIG. 9, to authenticate the document 900 (e.g., stock certificate, negotiable instrument, etc.), the composite image 901 is scanned in and the authentication tag 902 read in by either a scanner or a barcode reader and then authenticated according to the present invention. Alignment marks 903 on the document can help in reading the composite image and/or the authentication tag. Also illustrated in FIG. 9 is a serial number of the paper medium 904 and the image 905 of content of the document.

For a color document, color calibration bars can help in scanning the proper colors from the document, but is not preferable as this could be a security hole a counterfeiter can take advantage of. It is noted that the portion of the composite image 901 where the identifying information of the paper medium is located has no (or little) authentication distortion since it belongs to the paper medium and should not be modifiable. In applications where duplication-resistance is not needed, the paper medium does not need to be duplication-resistant and the identifying information on the paper medium (e.g., such as the serial number of the paper medium) can be omitted.

Digital Notorization

In contrast to the case in FIG. 9 in which the document is printed at the same time as the tag, FIG. 10 addresses the case in which the document is printed, handwritten, etc. and then it is authenticated such that the tag is printed later.

Figure 10:
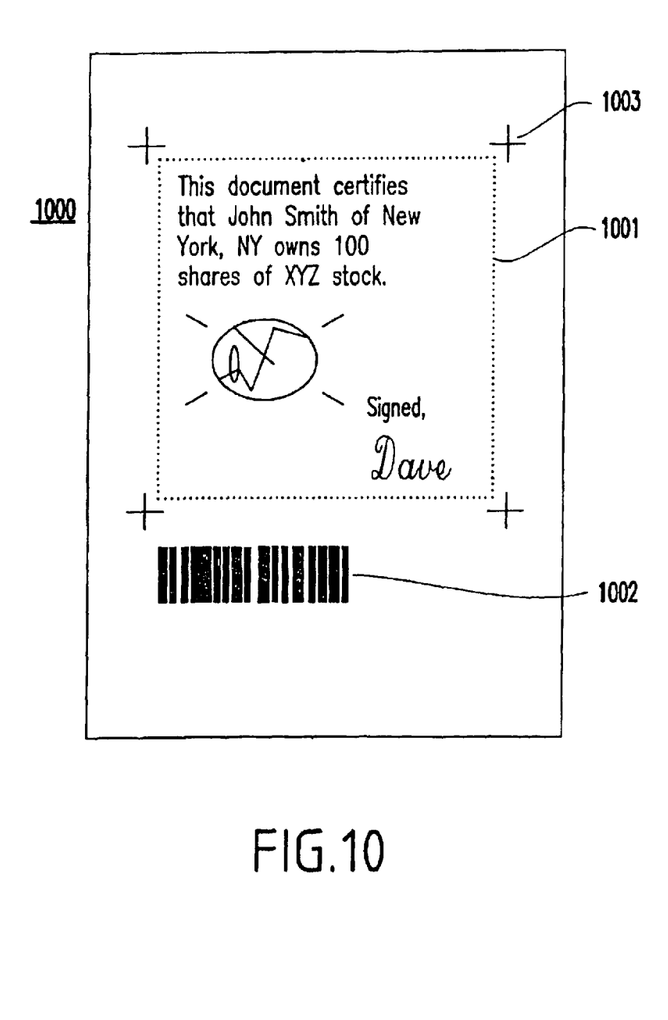
FIG. 10 shows an application of the proposed invention to digitally notarize original printed or handwritten documents.

Thus, herein below, an application of the present invention is described for notarizing printed or handwritten original documents 1001 digitally, as shown in FIG. 10. In this application, a printed or handwritten original document must be made authenticatable. The original document is produced independent of the process of making it authenticatable. In other words, it can be printed using special inks, contains handwritten signatures, etc. Next, the document is scanned in as an image and the method of the present invention is applied to generate an authentication tag T.

Then, the tag T is printed onto the document in a robust format such as a barcode, as discussed above. The tag is printed in a location which does not obstruct the original document. In this "digital notary" application, the authenticatibility distortion must be zero, as the image of the original document is not (or cannot be) modified. The method of the present invention generates a tag T and prints it onto the paper of the original document.

There are other applications where the original data cannot be changed and therefore the authenticatibility distortion must be zero. For example, images on a CD-R (Recordable CD-ROM) cannot be modified, yet authentication tags can be added to the images.

Another example is in the field of generating authentication tags of duplication- and imitation-resistant objects. For example, in U.S. patent application Ser. No. 09/397,503, entitled "Method and apparatus for producing duplication- and imitation-resistant identifying marks on objects, and duplication- and imitation-resistant objects" filed on Sep. 17, 1999 to Aggarwal et al., an object is produced by, for example, a chemical process resulting in a one-of-a-kind object, and this object can be authenticated using the present invention as follows.

First, the object is read by an appropriate reader resulting in a data set, and an authentication tag is generated from this data set. Then, the authentication tag is attached to the object. To authenticate the object, it is read by the same type of reader and the resulting data set is then authenticated using the authentication tag. It is clear that in this case the authenticability distortion is zero as the object is not modified, and the authentication scheme must tolerate some degree of modification as the readers might not read in exactly the same data set from the object.

Even though the color images discussed have tree color components, the present invention can be adapted to other color spaces (e.g. 4-color space such as cyan, magenta, yellow, and black (CMYK)) by one skilled in the art taking the present application as a whole. Furthermore, in addition to the indices of the quantization functions, additional information can be added to the vector X, such as date, time, name of owner, size of image, etc.

While the overall methodology of the invention is described above, the invention can be embodied in any number of different types of systems and executed in any number of different ways, as would be known by one ordinarily skilled in the art.

Figures 11, 12:
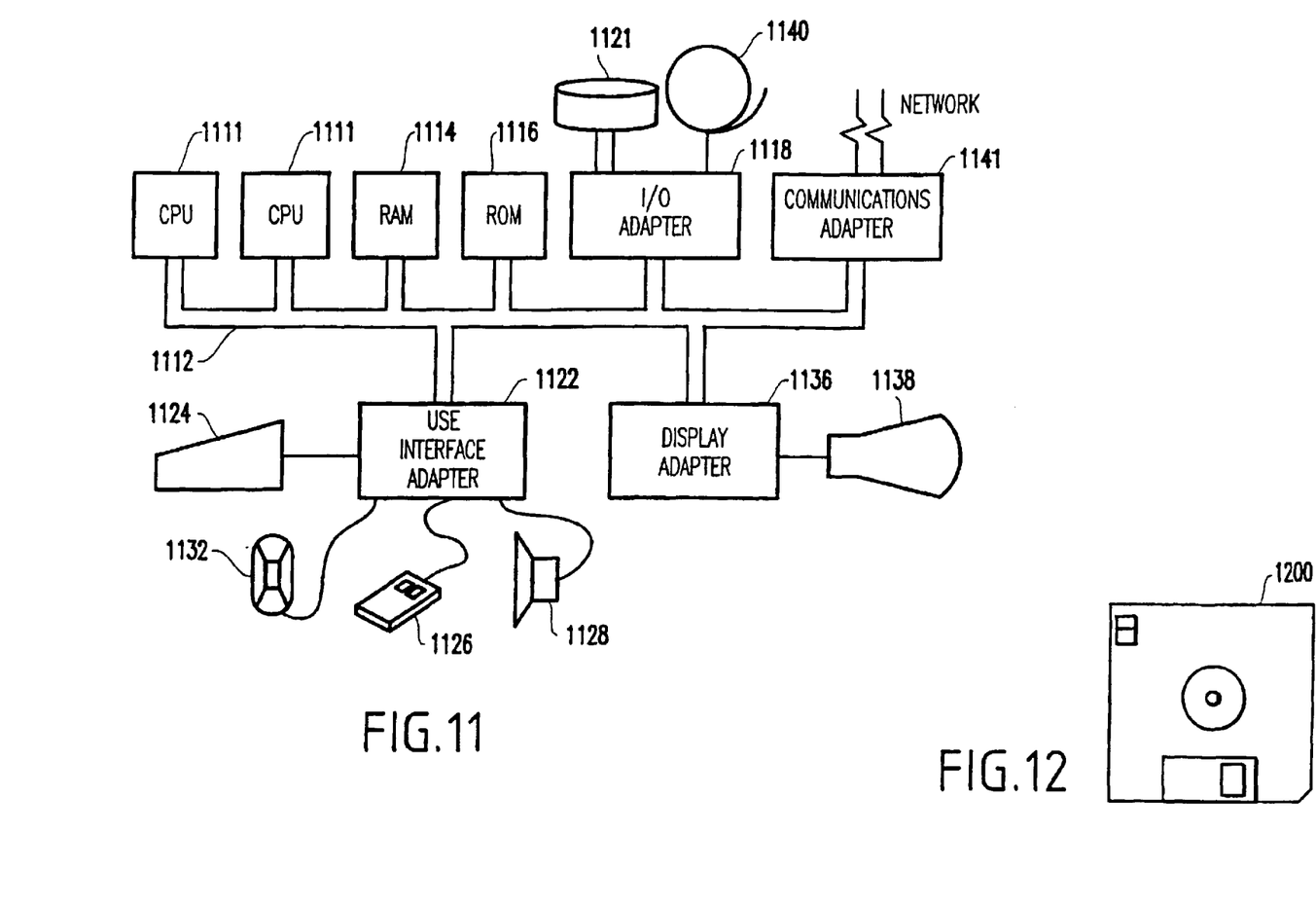
FIG. 11 illustrates an exemplary information handling/computer system for use with the present invention.
FIG. 12 illustrates a storage medium 1200 for storing steps of the program for the method according to the present invention.

For example, as illustrated in FIG. 11, a typical hardware configuration of an information handling/computer system for use with the invention. In accordance with the invention, preferably the system has at least one processor or central processing unit (CPU) 1111 and more preferably several CPUs 1111. The CPUs 1111 are interconnected via a system bus 1112 to a random access memory (RAM) 1114, read-only memory (ROM) 1116, input/output (I/O) adapter 1118 (for connecting peripheral devices such as disk units 1121, barcode reader 1150, scanner 1160 and tape drives 1140 to the bus 1112), user interface adapter 1122 (for connecting a keyboard 1124, an input device such as a mouse, trackball, joystick, touch screen, etc. 1126, speaker 1128, microphone 1132, and/or other user interface device to the bus 1112), communication adapter 1134 (for connecting the information handling system to a data processing network such as an intranet, the Internet (World-Wide-Web) etc.), and display adapter 1136 (for connecting the bus 1112 to a display device 1138). The display device could be a cathode ray tube (CRT), liquid crystal display (LCD), etc., as well as a hard-copy printer (e.g., such as a digital printer).

Thus, as shown in FIG. 12, in addition to the hardware/software environment described above, a different aspect of the invention includes a computer-implemented method for cryptography-based low distortion, robust data authentication. This method may be implemented in the particular environment discussed above.

Such a method may be implemented, for example, by operating the CPU 1111 (FIG. 11), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1111 and hardware above, to perform the above method.

This signal-bearing media may include, for example, a RAM (not shown in FIG. 12) contained within the CPU 1111 or auxiliary thereto as in RAM 1114, as represented by a fast-access storage for example. Alternatively, the instructions may be contained in another signal-bearing media, such as a magnetic data storage diskette 1200 (e.g., as shown in FIG. 12), directly or indirectly accessible by the CPU 1111.

Whether contained in the diskette 1200, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the unique and unobvious aspects of the present invention, a method (and system) are provided in which forged images having the same or similar tags as the original image are made difficult to construct while preserving the requirement that minor modifications to the image are tolerated. Further, the inventive method and system do not modify the source image significantly in order for the image to be authenticatable. Thus, there is not a significant amount of authenticability distortion.

Those skilled in the art will recognize that the invention can be practiced with modification within the spirit and scope of the appended claims.

I claim:

1. A method for generating an output file from a source file where benign modifications to a content of the output file still render the output file authentic, comprising:

constructing an index vector from said source file;

creating quantization functions based on the index vector and quantizing said source file using said quantization functions;

generating an authentication mark from the quantized source file and said index vector;

generating an authentication tag by appending the index vector to said authentication mark; and generating the output file by appending said authentication tag to said source file.

2. The method of claim 1, where said appending comprises:

inserting said authentication tag to said source file by a robust data hiding algorithm.

3. The method of claim 1, further comprising:

compressing said index vector.

4. The method of claim 1, further comprising:

applying a distortion to said source file, to form a distorted file, wherein the generating of the output tile is performed by appending said authentication tag to said distorted file.

5. The method of claim 1, further comprising:

providing a reader for reading the source file.

6. The method of claim 1, wherein the source file is positioned in a smart card.

7. The method of claim 1, wherein said authentication mark is obtained by a digital signature algorithm.

8. The method of claim 1, wherein said authentication mark is obtained by a modification detection algorithm.

9. The method of claim 1, wherein said authentication mark is obtained by a message authentication algorithm.

10. The method of claim 1, wherein said source file comprises image data.

11. The method of claim 1, wherein said source file comprises video data.

12. The method of claim 1, wherein said source file comprises sound data.

13. The method of claim 1, wherein no distortion is added to the source file to generate the output file.

14. The method of claim 1, wherein said tag is created simultaneously with a creation of said source file.

15. The method of claim 1, wherein said authentication tag is created after the source file has been created, and is appended to the source file.

16. A method for generating an output file from a source file where benign modifications to a content of the output file still render the output file authentic, comprising:

constructing an index vector from said source file;

constructing a feature vector of said source file;

creating quantization functions based on the index vector and quantizing said feature vector using said quantization functions;

generating an authentication mark from the quantized feature vector and said index vector;

generating an authentication tag by appending the index vector to said authentication mark; and generating the output file by appending said authentication tag to said source file.

17. The method of claim 16, further comprising:

constructing said index vector from said feature vector of said source file.

18. The method of claim 16, further comprising:

generating a distorted file from said feature vector, wherein the generating of the output file is performed by appending said authentication tag to said distorted file.

19. The method of claim 16, wherein said feature vector comprises discrete cosine transform coefficients.

20. A method for generating an output file from a source file where benign modifications to a content of the output file still render the output file authentic, comprising:

constructing an index vector from said source file;

creating quantization functions based on the index vector and quantizing said source file using said quantization functions;

compressing said index vector;

generating an authentication mark from the quantized source file and said compressed index vector;

generating an authentication tag by appending the index vector to said authentication mark; and generating the output file by appending said authentication tag to said source file.

21. A method for generating an output file from a source file where benign modifications to a content of the output file still render the output file authentic, comprising:

constructing an index vector from said source file;

creating quantization functions based on the index vector and quantizing said source file using said quantization functions;

compressing said index vector;

generating an authentication mark from the quantized source file and said index vector;

generating an authentication tag by appending said compressed index vector to said authentication mark; and generating the output file by appending said authentication tag to said source file.

22. A method for generating an output file from a source file where benign modifications to a content of the output file still render the output file authentic, comprising:

constructing a feature vector from said source file;

constructing an index vector from a feature vector of the source file;

quantizing said feature vector according to the index vector;

generating an authentication mark from quantized feature vector and said index vector;

generating an authentication tag by appending the index vector to said authentication mark; and generating the output file by appending said authentication tag to said source file.

23. The method of claim 22, further comprising:

compressing said index vector.

24. A method for authenticating a data file, comprising:

extracting an authentication tag from said data file;

extracting an index vector from said authentication tag;

extracting an authentication mark from said authentication tag;

creating quantization functions based on the index vector and quantizing said data file using said quantization functions; and verifying said index vector and said quantized data file with said authentication mark.

25. The method of claim 24, wherein said index vector comprises a compressed index vector.

26. The method of claim 25, further comprising:

decompressing said compressed index vector prior to said quantizing of said data file.

27. The method of claim 24, wherein said authentication mark is obtained by a digital signature algorithm.

28. The method of claim 24, wherein said authentication mark is obtained by a modification detection algorithm.

29. The method of claim 24, wherein said authentication mark is obtained by a message authentication algorithm.

30. A method for authenticating a data file, comprising:

extracting an authentication tag from said data file;

extracting an index vector from said authentication tag;

extracting an authentication mark from said authentication tag;

constructing a feature vector from said data file;

creating quantization functions based on the index vector and quantizing said feature vector using said quantization functions; and verifying said index vector and said quantized feature vector with said authentication mark.

31. A system for generating an output file from a source file where benign modifications to a content of the output file still render the output file authentic, said system comprising:

means for constructing an index vector from said source file;

means for creating quantization functions based on the index vector and quantizing said source file using said quantization functions;

means for generating an authentication mark from the quantized source file and said index vector;

means for generating an authentication tag by appending the index vector to said authentication mark; and means for generating the output file by appending said authentication tag to said source file.

32. A signal-bearing medium tangibly embodying a program of machine-readable instructions executable by a digital processing apparatus to perform a method for generating an output file from a source file where benign modifications to a content of the output file still render the output file authentic, said method comprising:

constructing an index vector from said source file;

creating quantization functions based on the index vector and quantizing said source file using said quantization functions;

generating an authentication mark from the quantized source file and said index vector;

generating an authentication tag by appending the index vector to said authentication mark; and generating the output file by appending said authentication tag to said source file.

* * * * *